US009628772B2

(12) United States Patent
Alfredsson et al.

(10) Patent No.: US 9,628,772 B2
(45) Date of Patent: Apr. 18, 2017

(54) METHOD AND VIDEO COMMUNICATION DEVICE FOR TRANSMITTING VIDEO TO A REMOTE USER

(71) Applicant: ABB SCHWEIZ AG, Baden (CH)

(72) Inventors: Fredrik Alfredsson, Västerås (SE); Elina Vartiainen, Västerås (SE); Jonas Brönmark, Västerås (SE); Tony Tsai, Christchurch (NZ); Mark Billinghurst, Christchurch (NZ); Matthew Tait, Christchurch (NZ)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/895,121

(22) PCT Filed: Jun. 27, 2013

(86) PCT No.: PCT/EP2013/063539
§ 371 (c)(1),
(2) Date: Dec. 1, 2015

(87) PCT Pub. No.: WO2014/206473
PCT Pub. Date: Dec. 31, 2014

(65) Prior Publication Data
US 2016/0127712 A1    May 5, 2016

(51) Int. Cl.
*H04N 7/14*    (2006.01)
*H04N 13/00*    (2006.01)
(Continued)

(52) U.S. Cl.
CPC ......... *H04N 13/0059* (2013.01); *H04N 7/142* (2013.01); *H04N 7/183* (2013.01);
(Continued)

(58) Field of Classification Search
USPC ................ 348/14.07, 14.12, 14.16, E13.022, 348/E13.067, 48, 139, E13.02, E13.002,
(Continued)

(56) References Cited

U.S. PATENT DOCUMENTS 6,985,620 B2    1/2006  Sawhney et al.
2010/0315416 A1    12/2010  Pretlove et al.
(Continued)

FOREIGN PATENT DOCUMENTS

DE    10 2011 085 003 A1    4/2013
SE    1300138 A1    3/2013
(Continued)

*Primary Examiner* — Yosef K Laekemariam
(74) *Attorney, Agent, or Firm* — Birch, Stewart, Kolasch & Birch, LLP

(57) ABSTRACT

A method, computer program product and video communication device are provided for transmitting video to a remote user. The video communication device includes a communication interface for providing a communication session with a device of the remote user, a camera capturing images, and a control unit configured to obtain a three-dimensional model of the location, control the camera to capture video images of the location, determine a current orientation of the video communication device, and transfer the three-dimensional model and orientation to the device of the remote user together with a video stream from the camera comprising the captured video images.

20 Claims, 6 Drawing Sheets

(51) Int. Cl.
  *H04N 21/4223* (2011.01)
  *H04N 21/81* (2011.01)
  *H04N 21/422* (2011.01)
  *H04N 21/44* (2011.01)
  *H04N 21/4788* (2011.01)
  *H04N 21/6587* (2011.01)
  *H04N 7/18* (2006.01)

(52) U.S. Cl.
  CPC ....... *H04N 21/422* (2013.01); *H04N 21/4223* (2013.01); *H04N 21/42202* (2013.01); *H04N 21/44008* (2013.01); *H04N 21/4788* (2013.01); *H04N 21/6587* (2013.01); *H04N 21/816* (2013.01); *H04N 21/8126* (2013.01); *G05B 2219/32014* (2013.01)

(58) Field of Classification Search
  USPC ..................................................... 348/E13.04
  See application file for complete search history.

(56) References Cited

U.S. PATENT DOCUMENTS

| | | |
|---|---|---|
| 2012/0194516 A1 | 8/2012 | Newcombe et al. |
| 2013/0009950 A1 | 1/2013 | Ben-David et al. |

FOREIGN PATENT DOCUMENTS

| | | | | |
|---|---|---|---|---|
| WO | WO 2009/074600 A1 | 6/2009 | | |
| WO | WO 2011/008660 A1 | 1/2011 | | |
| WO | WO2012/018497 | * 2/2012 | ............... | G06T 7/00 |
| WO | WO 2012/018497 A2 | 2/2012 | | |

* cited by examiner

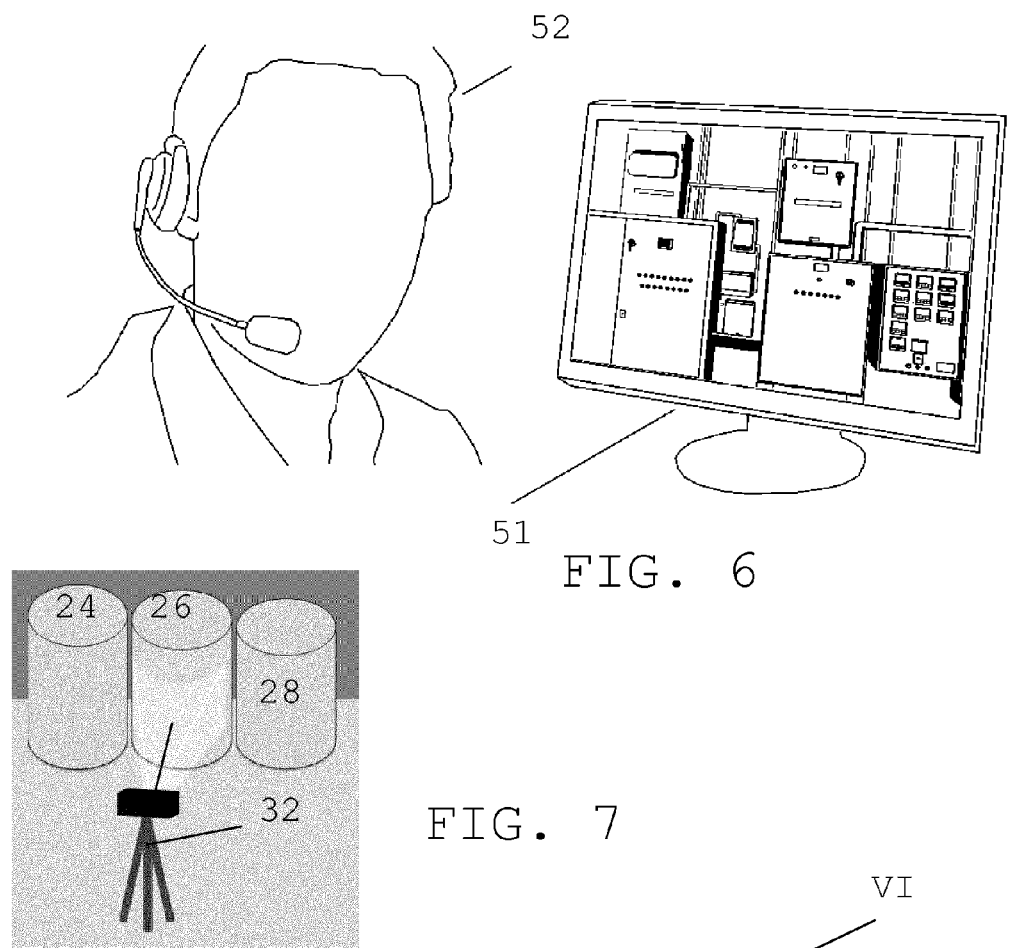
FIG. 6
FIG. 7
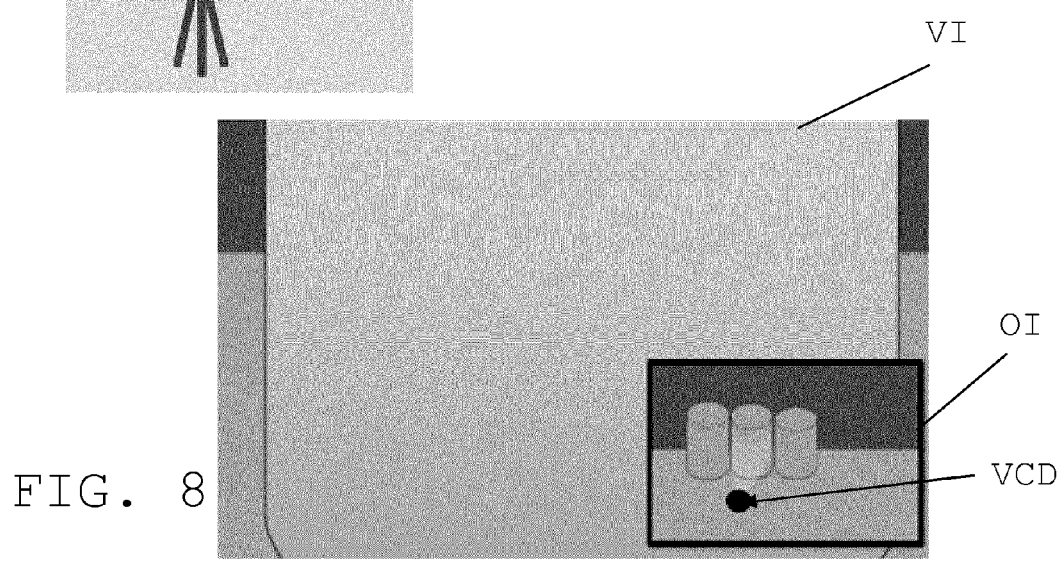
FIG. 8

METHOD AND VIDEO COMMUNICATION DEVICE FOR TRANSMITTING VIDEO TO A REMOTE USER

FIELD OF THE INVENTION

The present invention generally relates to process control systems. More particularly the present invention relates to a method, computer program product and video communication device for transmitting video to a remote user from an industrial site where a process control system is operated.

BACKGROUND

In process control systems it is very important to keep production running at all times as even a minor halt in production will cost large amounts of money. Because of this, maintenance is seen as very important in order to keep the production up and running.

One useful tool provided for local maintenance in a process control system is described in SE1300138.

Maintenance can be very expensive as it is sometimes necessary to bring in external experts to help with advanced operations the regular personnel might not have the expertise to handle by themselves.

Collaboration over a telephone line between the local worker and the expert is not effective enough in all situations as the expert is not able to see what the local worker is doing. Sending pictures back and forth is also a slow way of sharing information. The expert may need to see what happens on site and may need to be able to instruct the personnel on site without the risk of any misinterpretation.

In such situations it is beneficial to transfer video of the site to the external expert. It is then also possible to zoom in a camera in order to obtain details at the site. However, then it may be hard to retain the context. It may thus be hard to retain an overall view.

Three-dimensional models have been known to be used in various situations.

WO 2012/018497 describes a system where a three-dimensional model of images of a scene of interest is forwarded to a number of handheld computers. Images of a scene are obtained, and provided to a central device that provides the 3D model and exports the model to the handheld devices at the scene.

US2010/0315416 discloses a system where there is a central computer with a 3D model. In the system cameras are used to capture images of an object, which images are transferred to the central computer and combined with a 3D model.

DE 102011085003 discusses importing digital images into a virtual environment, which virtual environment is a 3D environment.

WO 2011/008660 discusses the transmission of positional information of a video camera in a video stream.

However, none of the documents discuss the use of three-dimensional models for improving the context of a video stream.

There is thus room for improvement within the field, especially when providing a context for a captured video stream.

SUMMARY

The present invention is concerned with the problem of providing a context for a video stream transmitted from a process control system to a remote user.

This object is according to a first aspect achieved through a method of transmitting video to a remote user from an industrial site where a process control system is operated, the method being performed by a video communication device being placed at a location of the industrial site and performed in relation to a communication session carried out with a device of the remote user, the method comprising:
obtaining a three-dimensional model of the location,
capturing video images of the location using a camera,
determining a current orientation of the camera, and
transferring the three-dimensional model and orientation to the device of the remote user together with a video stream comprising the captured video images.

This object is according to a second aspect achieved through a video communication device for transmitting video to a remote user from an industrial site where a process control system is operated, the video communication device being placed at a location of the industrial site and comprising:
a communication interface for providing a communication session with a device of the remote user,
a camera capturing images, and
a control unit configured to
obtain a three-dimensional model of the location,
control the camera to capture video images of the location,
determine a current orientation of the camera, and
transfer the three-dimensional model and orientation to the device of the remote user together with a video stream from the camera comprising the captured video images.

This object is according to a third aspect achieved through a computer program product for transmitting video to a remote user from an industrial site where a process control system is operated, the computer program product being provided on a data carrier comprising computer program code configured to cause a video communication device comprising a camera to, when the computer program code is loaded into the video communication device and the video communication device is placed at a location of the industrial site and is involved in a communication session with a device of the remote user—obtain a three-dimensional model of the location,
capture video images of the location using the camera,
determine a current orientation of the camera, and
transfer the three-dimensional model and orientation to the device of the remote user together with a video stream comprising the captured video images.

The invention has a number of advantages. The invention provides contextual data in relation to a captured video stream. This increases the situational awareness over a regular video stream, which leads to a less confusing situation and higher location awareness for a remote user that is to interpret information in the video stream. Through the use of the model it is possible to obtain a complete picture of the location where overview can be combined with detail.

BRIEF DESCRIPTION OF THE DRAWINGS

The present invention will in the following be described with reference being made to the accompanying drawings, where FIG. 1 schematically shows an industrial plant with a process control system operating an industrial process together with a video communication device, FIG. 2 schematically shows a block schematic of units inside a housing of the video communication device.

DETAILED DESCRIPTION OF THE INVENTION

This invention presents a way for a remote user to gather relevant data and provide instructions and directions for local engineers at a location of an industrial plant where a process control system operates.

Figure 1:
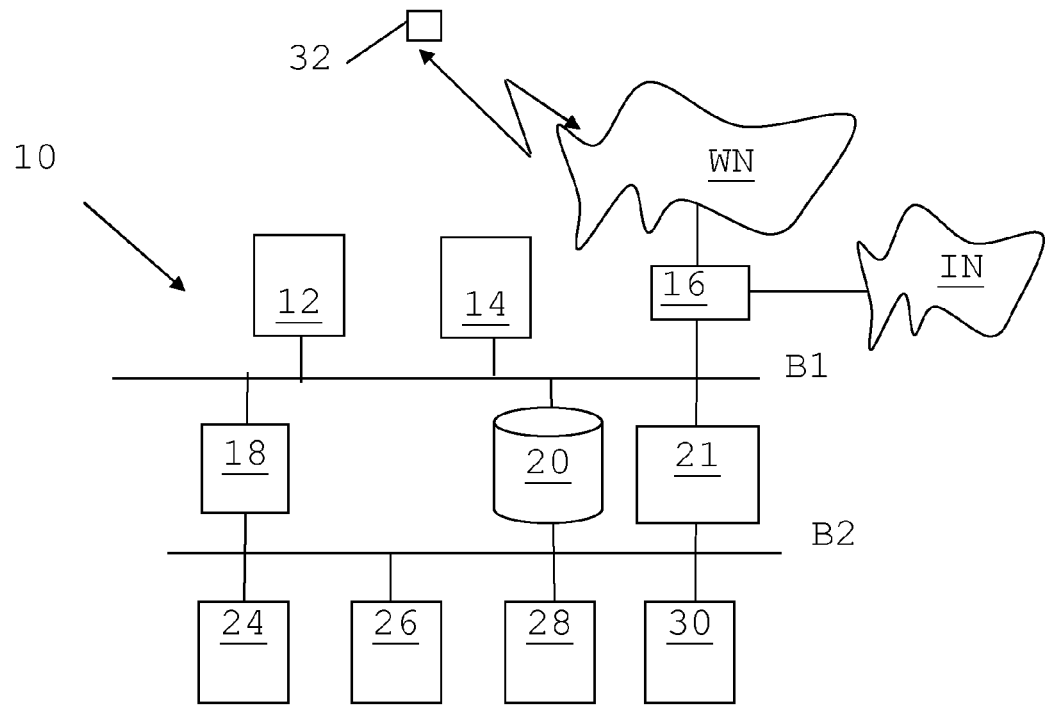

FIG. 1 schematically shows an industrial plant where a process control system 10 is provided. The process control system 10 is a computerized process control system for controlling an industrial process. The process can be any type of industrial process, such as electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a server handling monitoring and control of the process.

In FIG. 1 the process control system 10 therefore includes a number of process monitoring computers 12 and 14. These computers may here also be considered to form operator terminals and are connected to a first data bus B1. There is also a gateway 16 connected to this first data bus B1, which gateway 16 is connected to at least one wireless network WN. The gateway is also connected to a public data communication network, which is here the internet IN. To the wireless network WN there is connected a video communication device 32. The wireless network WN may be a local network, such as a wireless local area network (WLAN). It may also be a Bluetooth network, i.e. a network with a number of interconnected Bluetooth nodes. It may also be a mobile communication network.

There is furthermore a second data bus B2 and between the first and second data busses B1 and B2 there are connected a server 18 providing control and protection of the process and a database 20 where data relating to control and protection of the process is stored. Such data relating to control and protection may here comprise process data such as measurements and control commands, while data relating to protection may comprise alarm and event data as well as data on which alarms and events can be generated, such as measurements made in the process. It may also provide face plates of process control objects, which face places may comprise process control data from the database 20 regarding the process control object. There is furthermore an optional object data server 21 connected between the two buses B1 and B2. The object data server 21 comprises data about all process control objects, such as blueprints, instructions and manuals regarding the process control objects.

To the second data bus B2 there is furthermore connected a number of further devices 24, 26, 28 and 30. These further devices 24, 26, 28 and 30 are field devices, which are devices that are interfaces to the process being controlled. A field device is typically an interface via which measurements of the process are being made and to which control commands are given. Because of this the field devices are furthermore process control objects. In one variation of the invention a first field device is a first process control object 24, a second field device is a second process control object 26 and a third field device is a third process control object 28.

Figure 2:
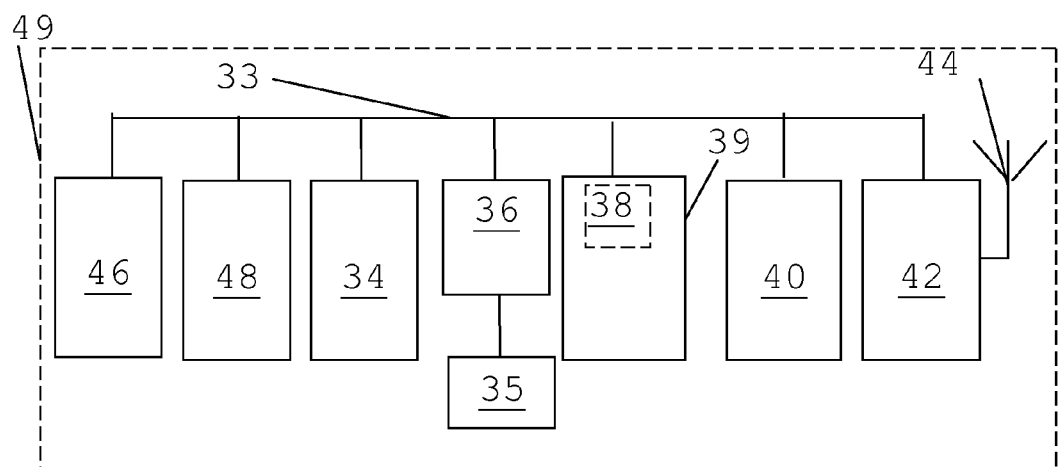

FIG. 2 shows a block schematic of a number of units that are provided in the video communication device 32. The video communication device 32 is provided with a housing 49. In the housing 49 there is provided a bus 33, and to this bus 33 there is connected an optional short range communication unit 46 or proximity sensor, a video projector 48, a camera 34, a recording controller 36, a program memory 39, a processor 40 as well as a radio communication circuit 42. It may also comprise at least one further sensor, for instance a temperature sensor, accelerometer, ambient light sensor and gyroscope (not shown). The radio communication circuit 42 is furthermore connected to an antenna 44, where the radio communication unit 42 and antenna 44 are provided for communication with the wireless network WN. The radio communication circuit 42 and antenna 44 together form one type of communication interface for communicating with the process control system as well as with other entities. It may for this reason be a WiFi or WLAN interface. It may also be a mobile communication interface. It should also be realized that there may be two communication interfaces in the video communication device, one mobile communication interfaces and one WiFi interface. The recording controller 36 is in turn connected to a microphone 35. The recording controller 36 and microphone 35 together form a recording unit that may be used for recording sound in a location of the process control system. Although it is not shown, the video communication device 32 may also comprise sound emitting units such as speakers and earphones. It is also possible that a microphone and earphone are combined into a headset connected to the video communication device 32. The short range communication unit 46 may also be regarded as a type of sensor, an object sensor or proximity sensor, for sensing a process control object to be serviced. This sensor may be implemented through Near Field Communication (NFC) technique.

In the program memory 39 there is provided software code which when being run by the processor 40 forms a control unit 38. The control unit 38 is more particularly configured to perform a number of functions under the control of a remote user.

Figure 3:
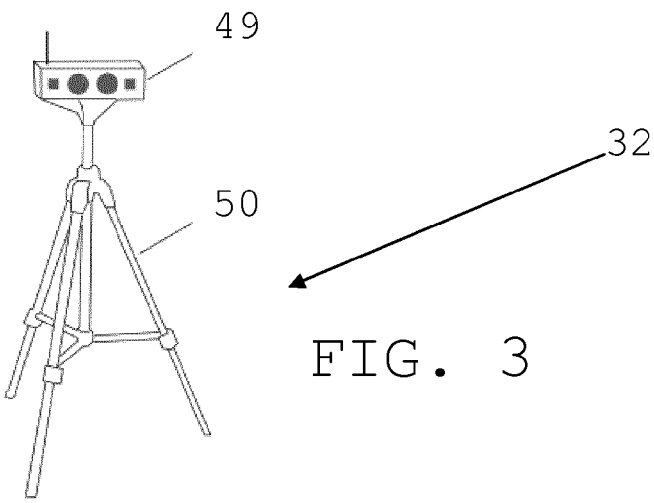
FIG. 3 shows a perspective view of the video communication device in the form of the housing on a tripod.
Figure 4A:
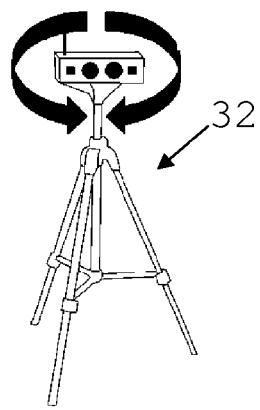
FIGS. 4a and 4b show perspective views of the video communication device indicating various possibilities of movement of the housing, FIG. 5 schematically shows the video communication device communicating with a computer of a remote user via the Internet, FIG. 6 schematically shows the remote user with his computer on which video of a location in the process control system is shown, FIG. 7 schematically shows the use of a camera of the video communication device for capturing a video of part of a process control object at the location, FIG. 8 schematically shows the presentation of the video together with a three-dimensional view of the location and the video communication device, FIG. 9 schematically shows a flow chart of a method of transmitting video to the remote user being performed by the video communication device, FIG. 10 schematically shows the location with the video communication device providing a projecting area in which a presentation item is provided, FIGS. 11a and 11b schematically shows the location with the video communication device and presentation item when the projecting area is being moved, FIG. 12 schematically shows a flow chart of a method of operating the video communication device by the remote user, and FIG. 13 schematically shows a data carrier with computer program code, in the form of a CD-ROM disc, for implementing a control unit of the video communication device.
Figure 4B:
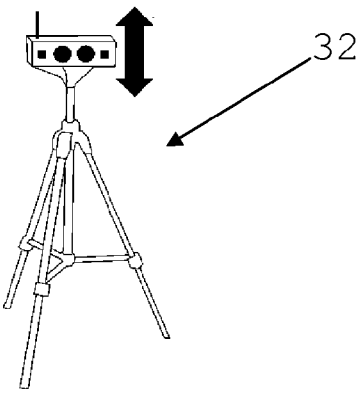

The video communication device 32 may be moved within the premises of the industrial plant. It may thus be moved from one location to another location. It may also be placed so that it will be able to capture video images and present digital presentations via the projector 48. For this reason the housing 49 may be placed on a tripod 50, which is schematically shown in FIG. 3. The camera 34 has a field of view, i.e. an area in which it detects its environment. This field of view may be changed in different ways. It may be increased through zooming out commands and it may be decreased through zoom in commands. The field of view may also be shifted or moved using various types of pan commands. In order to obtain panning, the orientation of the camera may be changed. In a similar manner the projector has a presentation area or projection area, i.e. an area within which it is able to visually present information. The presentation area may be centred on a line of sight of the projector and may have any suitable shape, such as circular, rectangular and quadratic. Also this presentation area may be moved through changing the orientation of the projector. The camera 34 may change its orientation in three dimensions. Also the projector 48 may change its orientation in three dimensions. They may furthermore be independently changeable. In one variation the orientations may be changed jointly through the whole housing 46 being able to change orientation. FIGS. 4a and 4b schematically show movement achieving such reorientation. It can be seen that the housing 49 may be rotated in a horizontal plane 360 degrees around a vertical axis of rotation of the tripod 50. It can also be seen that the housing 49 may be tilted vertically upwards or downwards. In order to obtain such movement the video communication device 32 may be provided with at least one motor for obtaining such movement. As was mentioned above, it may also be provided with more than one motor, for instance one for providing vertical movement and another for providing horizontal movement. In order to obtain separate movements of the camera and projector, there may also be two such pairs of motors provided, where one pair is provided for the camera 32 and the other for the projector 48. These separate movements may furthermore be provided while the camera and projector are still provided inside the same housing.

As was indicated above, the projector 48 may change orientation independently of the camera. The camera 34 and projector 48 may thus point in different directions.

Figure 5:
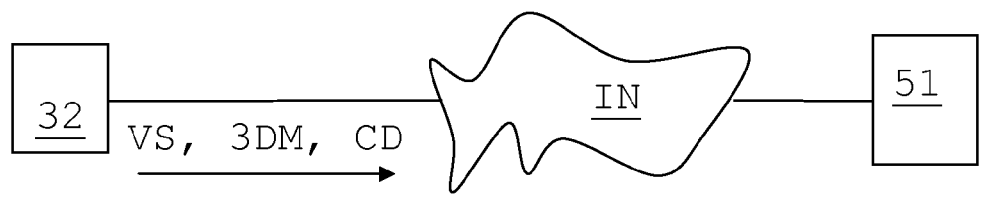

As can be seen in FIG. 1 the video communication device 32 may access the Internet IN via the wireless network WN. This allows the video communication device 32 to be operated remotely, i.e. from some other site than the plant. The video communication device 32 may thereby operated by a remote user, for instance via a computer of a remote user 52. This situation is schematically shown in FIG. 5. Here it can be seen that a computer 51 of the remote user 52 may communicate with the video communication device 32 via the Internet. The control unit 38 of the video communication device 32 may in this way be able to receive commands from the remote user 52, for instance through a web site to which the remote user 52 may log in. As an alternative a control command may be sent directly from the computer 51 of the remote user 52.

Thereby the remote user 52 may be able to obtain video images captured by the camera 34 of the video communication device 32, which video images are then presented for the remote user 52 via the display of his or her computer 51. This is shown in FIG. 6. FIG. 5 schematically indicates the transmission of a video stream VS, a three-dimensional model 3DM and camera data CD from the video communication device 32 to the computer 51 of the remote user 52. Information from the sensors may also be sent wirelessly through Internet to the remote user. Information provided by the remote user back to the plant may also be sent through Internet. More information about the transmission will be give shortly.

Now some variations of the invention will be described in more detail.

In industry, for instance in an industrial plant where a process is being run by a process control system, it is very important to keep production running at all times as even a minor halt in production will cost large amounts of money. Because of this, maintenance is seen as very important in order to keep the production up and running.

Maintenance can be very expensive as it is sometimes necessary to bring in external experts to help with advanced operations the regular personnel might not have the expertise to handle by themselves. Collaboration over a telephone line between a local worker and the expert is often not good enough. The expert may need to see what happens on site and may need to be able to instruct the personnel on site without the risk of any misinterpretation. Sending pictures back and forth is also a slow way of sharing information, so this is also not really good.

It can thus take a long time to get hold of the correct expert and fly in this expert to the site.

In the case of an unexpected breakdown requiring help from an external expert in order to continue production this can lead to long downtimes as the expert might have to travel long distances to get to the site.

Flying in an external expert can be very expensive. Not only from the costs associated with the expert (travels, accommodation etc.) but a halt to production as the plant personnel is waiting for the expert to arrive can be very expensive for the owner.

The above mentioned situation is solved through the use of the video communication device.

In operation, i.e. when there is some kind of problem at a location in the plant, the video communication device is brought out to this location of the industrial site and placed at a position in the location where assistance is needed. The device may for instance be placed in the centre of a room. The video communication device may be placed at this location by a local user in order to be used for solving a problem at the location, for instance the fact that one or more of the machines or process control objects may be faulty or that the process has a strange behaviour at the location.

As the device is brought to the location a number of activities may thus be performed.

Figure 9:
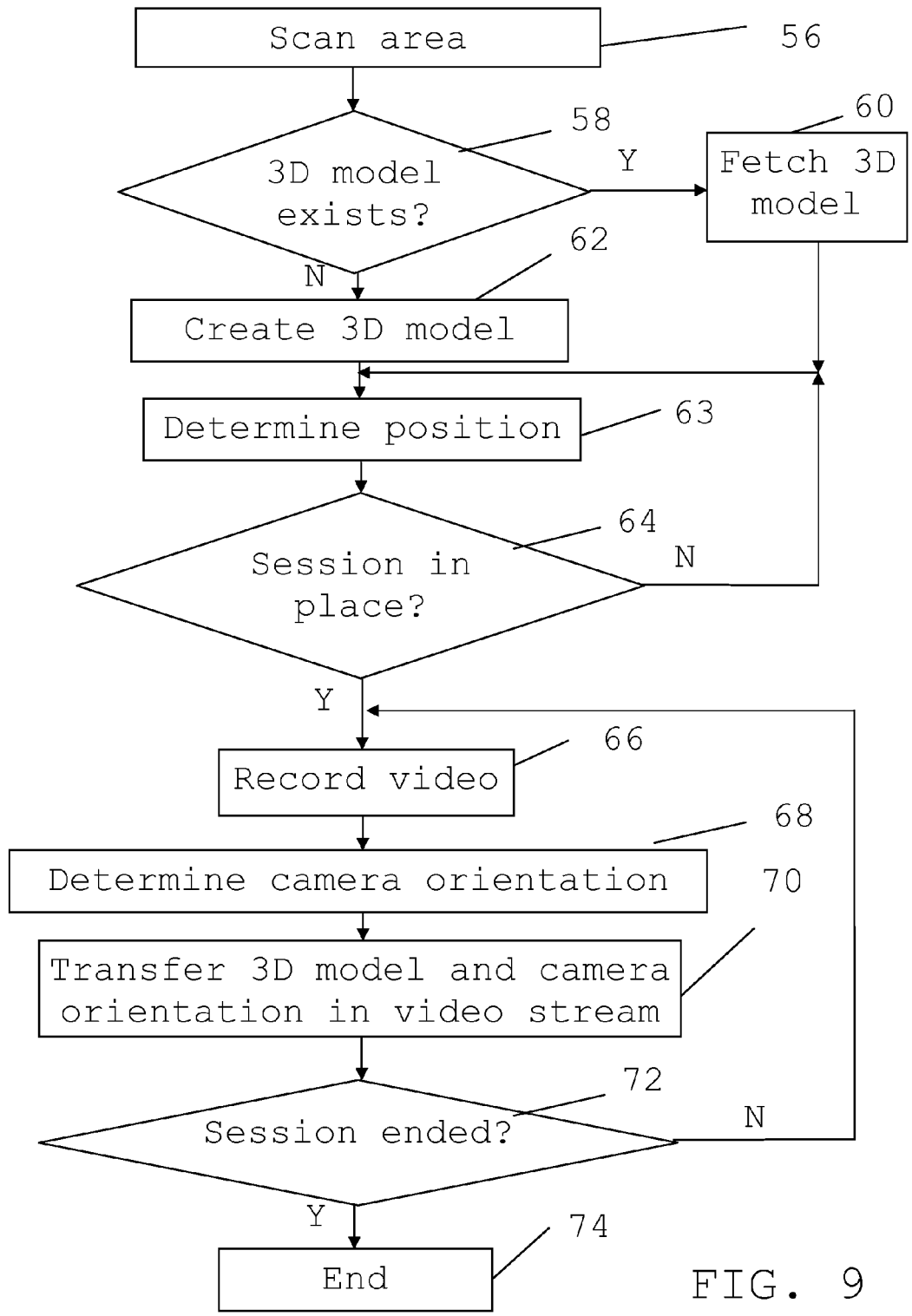

In a first variation the remote user is provided with contextual data in relation to a video stream. Now this first variation will be described with reference being made to FIGS. 7, 8 and 9, where FIG. 7 schematically shows the use of a camera of the video communication device for capturing a video of a part of a process control object at a location of the industrial site, FIG. 8 schematically shows the presentation of the video together with a three-dimensional view of the location and the video communication device and FIG. 9 schematically shows a flow chart of a method of transmitting video to the remote user being performed by the video communication device.

According to the first variation, the control unit 38 first makes the video communication device 32 scan the area at the location, step 56. This may be done through the control unit 38 controlling a motor to rotate the housing 49 around a vertical rotational axis combined with controlling a motor to tilt the housing 49 up and down with different tilt angles as shown in FIGS. 4a and 4b. In this way a three-dimensional space around the position of the video communication device is captured with different video images using the camera 34.

After the area has been scanned, the control unit 38 analyses the captured images and investigates if it recognises them with regard to a pre-existing three-dimensional model of the location and objects at this location, i.e. of the process control objects and possible other objects present at the location. If it recognizes the video images and that therefore there is a pre-existing model, step 58, then this model is fetched, step 60. The pre-existing three-dimensional model may be provided in the video communication device 32. As an alternative it may be obtained or fetched from a server, such as server 21. If there is a pre-existing model then data about a previous position of the video communication device at the location as well as camera orientations and video streams recorded as the data presenting device was placed at this previous position may be stored together with the model. Also this previous position data and associated historic video streams may be fetched. If any three-dimensional model has been made of the location, then this is thereby obtained. However, if there was no pre-existing model, step 58, a new three-dimensional model 3DM of the location and the various objects in it is created by the control unit 38, step 62. In this case a model is thus obtained through creating it. A model may for instance be created using augmented reality functionality. If the data presenting device comprises an infrared sensor it is also possible to use infrared technology, such as Microsoft Kinect. A 3D map of natural features at the location can be built using a variety of feature extraction methods such as corner or edge detection both with 2D RGB data and 3D RGBD (Red, Green, Blue, Depth) data. Using this sparse map it is also possible to determine the location of the video communication device 32 with camera 34. It is also possible to determine the orientation or pose of the camera 34. It is thus possible to determine in which direction the camera 34 is pointing. The orientation may be calculated based on Registration algorithms. These algorithms can be used to locate the features of a current frame or video image in the map of the real world and based on this the orientation of the camera 34 may be determined.

The process control objects, i.e. the real world objects, may be provided with object identifiers, such as NFC tags or bar codes. If these are read it is possible to obtain information about what types of objects they are. The type may be identified through the camera 34 detecting a visual object identifier, like a bar code. As an alternative the short-range communication unit may be set to read a tag with the object identifier. Such a code may be used to fetch data associated with the object for instance from a database in the process control system. In order to simplify the fetching of such data, the control unit 38 may therefore store an association of the object identifiers to the objects in the model 3DM of the location.

The scanning or short-range communication may also be used by the control unit 38 for determining the position of the video communication device 32 at the location, step 63, i.e. the position in relation to the layout and various objects at the location. This may also involve adding the video communication device to the three-dimensional model 3DM of the location.

The above mentioned steps may have been performed before a communication session is started with the remote user 52. Such a session may be performed using a TCP connection set up using WiFi and the Internet. As an alternative the steps are performed after a communication session is started. In both cases the control unit 38 investigates if a communication session is in place or on-going, which in this case at least involves a voice communication session between the remote user and a local user via sound generating equipment and sound recording equipment of the video communication device 32 and the computer 51. It also involves transmission of a live video stream VS, which may be a one way video stream from the video communication device 32 in the process control system to the computer 51 of the remote user 52.

In some instances it may involve a two-way video conference, i.e. where also video is provided by the computer 51 of the remote user 52 and conveyed to the video communication device 32. Video images captured by the camera 34 may thus be transferred to the remote user 52. Also data of the remote user 52 may be made to be projected at the location under the control of the remote user.

If no session is in place, step 64, the control unit 38 waits for one to be started either by the local user or the remote user 52.

If however one is on-going, step 64, the control unit 38 controls the camera 34 to record a video stream, step 66. It thus controls the camera 34 to capture video images VI of the location. The control unit 38 also continuously determines the camera orientation, step 68, for instance based on the line of sight of a viewfinder of the camera 34. Thereby the control unit 38 determines a current orientation of the video communication device 32. The orientation may be provided as a solid angle related to the position of the video communication device and a reference angle. As an alternative or in addition, it is also possible to use a gyro and/or accelerometer for determining the orientation.

In the communication session, the model 3DM may be transmitted from the video communication device to the remote user 52. The three-dimensional model 3DM may more particularly be transmitted together with camera data CD in or beside the video stream VS, step 70, where the camera data may comprise the camera orientation. The camera data may also comprise the position of the camera, i.e. of the video communication device. It is furthermore possible that the control unit 38 modifies the model of the location so that the video communication device and orientation is a part of the model. The camera data may thus be provided as a part of the model. In this case the orientation may thus be provided as a part of the three-dimensional model that is continuously transferred to the device of the remote user. Alternatively orientation changes may be transmitted as updates of the three-dimensional model during the transfer of video images from the video communication device to the device of the remote user. The computer of the remote user may then use these updates in modifying the three-dimensional model.

The remote user then receives the video stream together with the model 3DM and camera data CD. The remote user may then see both the captured video as well as obtain a three-dimensional view of the location using the model 3DM. It is in this way possible for the remote user to see where in the site he is looking.

An example of this is shown in FIGS. 7 and 8. FIG. 7 shows how the video communication device 32 is at the same location as the first, second and third process control objects 24, 26 and 28 and how it captures video images of a part of the second process control object 26. It thus records the video for the remote user 52. FIG. 8 shows a video image VI in the video stream VS as it would look when displayed on the computer 51 of the remote user 52. This video image may comprise a lot of useful information. However, it may lack context. This context is provided through also transmitting the model 3DM and camera data CD with the video stream VS. FIG. 8 shows the screen that the remote user 52 is able to see on the display of his or her computer 51. The view contains the live video stream from the camera, of which the image VI is presented. Furthermore, contextual information is provided through an overview image OI of the location, which overview image OI is obtained through visualizing the model 3DM of the location with the video communication device VCD and its orientation. It is here possible that the remote user computer 51 is able to place a representation of the video communication device with the orientation of the image into the model. Alternatively this has already been done by the control unit 38 of the video communication device 32. In the later case a modified model which shows the video communication device and orientation is provided.

The control unit 38 then investigates if the communication session is ended. If it is not, step 72, then video is continued to be recorded and camera orientation determined, step 68 and transferred together with the model to the remote user, step 70. However, if the communication session is ended, step 72, operation is also ended, step 74.

It can in this way be seen that according to this first variation, it is possible to track the current position and orientation of the camera 34 in a video conferencing situation while also building a map of the environment so that the remote user 52 can have a better situational awareness of the location. As can be seen in FIG. 8, the remote user 52 sees both the current camera view VI, but can also use the small picture OI in the right corner to get an excellent overview of the surroundings.

The remote user may here also be able to navigate in the constructed 3D view and is therefore not limited to observing the current frame from the video transition but is free to "explore" the known 3D model built from the video frames.

A video conference call, where the goal is to share one user's environment, will not be limited to simply streaming video data but may also include data regarding the position as well as current pose or orientation of the camera, where the orientation may be set as the orientation of a line of sight of a view finder of the camera.

If a previous model existed, it is furthermore possible for the remote user to fetch video streams previously recorded at the location with positions of the video communication device and camera orientations when these historic video streams were recorded.

Some advantages of the invention can be better realized from the following scenario:
1. A local maintenance engineer is doing some maintenance on the factory floor when he identifies a potential issue; he calls the remote user and starts a video call to get advice on the situation.
2. He uses the camera on the video communication device and makes it scan the location to show the current situation of a process control object, in this example the second process control object 26, as well as the surrounding environment.
3. Different frames of the video are processed to form a map of the environment. In the forming of the map also the position of the video communication device is determined. Using this map and a current video image, the current orientation or pose of the camera is calculated.
4. The map 3DM of the environment with camera data are then sent over the network during the call along with the video stream.
5. This additional information helps the remote user to orientate himself in the world given the dynamic nature of the orientation of the camera, as he can see the map of the environment and the video stream simultaneously. The remote user gets a much better situational awareness than a normal video conference system would give him.
6. The two users may then manage to solve the situation thanks to the efficiency of the video collaboration system that enables the remote user to get a very clear understanding of the local environment in the industrial site.

The first variation has a number of further advantages. In the first variation the camera and map data, i.e. the camera data and three-dimensional model, are transferred together with a video stream. This increases the situational awareness over a regular video stream, which leads to a less confusing situation and higher location awareness.

The streamed data is used to create a complete picture of the location. The remote user can use this 3D model to navigate the point of view independently of the physical camera position; this will give the remote user a great situational awareness.

Another advantage is that the number of unnecessary questions are reduced, question such as, "Where are you now?", "What part am I looking at now?" and other deictic questions that engineers collaborating remotely are forced to ask today are avoided.

The communication will also become more accurate. Communication errors relating to location will be less common.

The collaboration between the two users will also become more efficient. The time taken for video collaboration task to be completed will most probably be improved.

It is furthermore possible that the safety is increased. As the remote user has a better awareness of the situation at hand, he can observe whether the local user is performing the correct actions.

Figure 10:
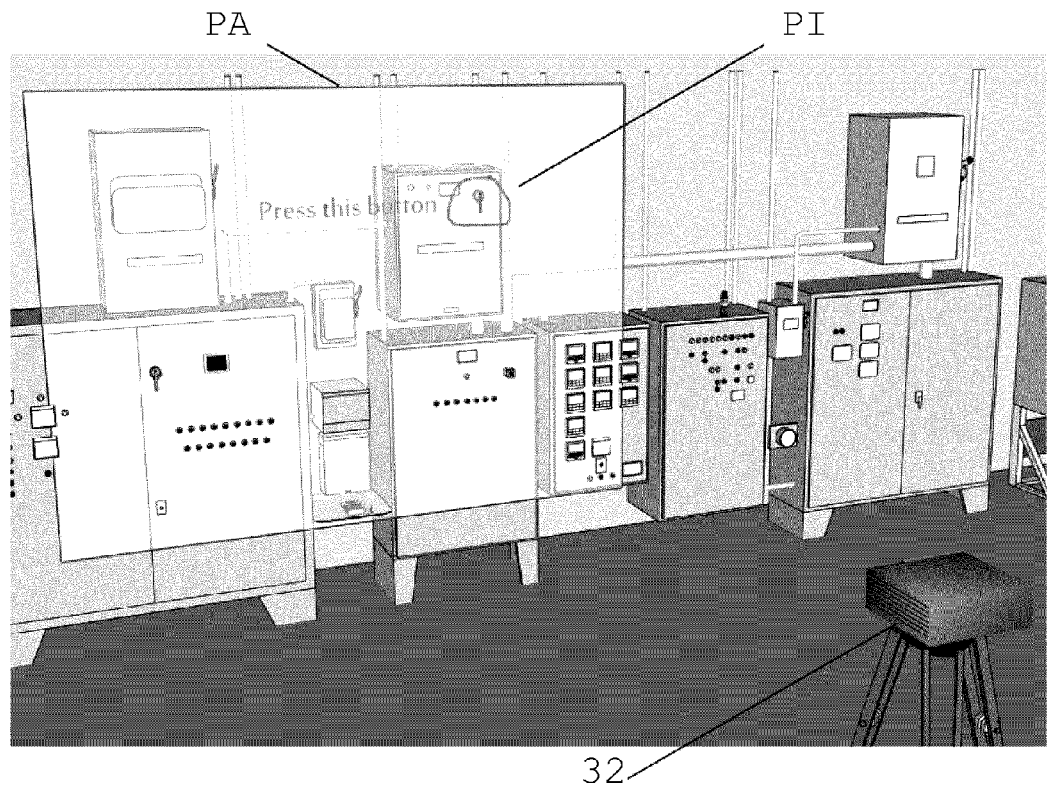
Figures 11A, 11B:
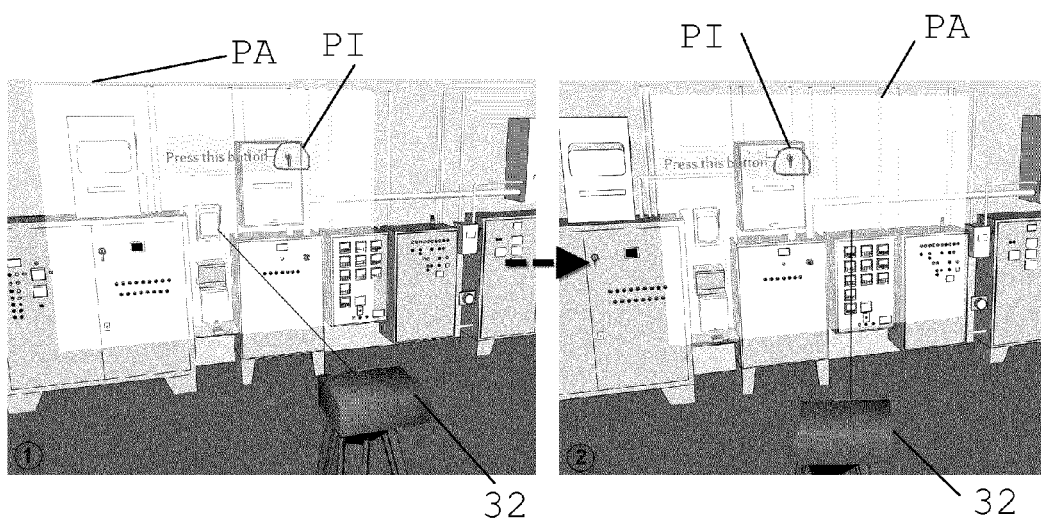
Figure 12:
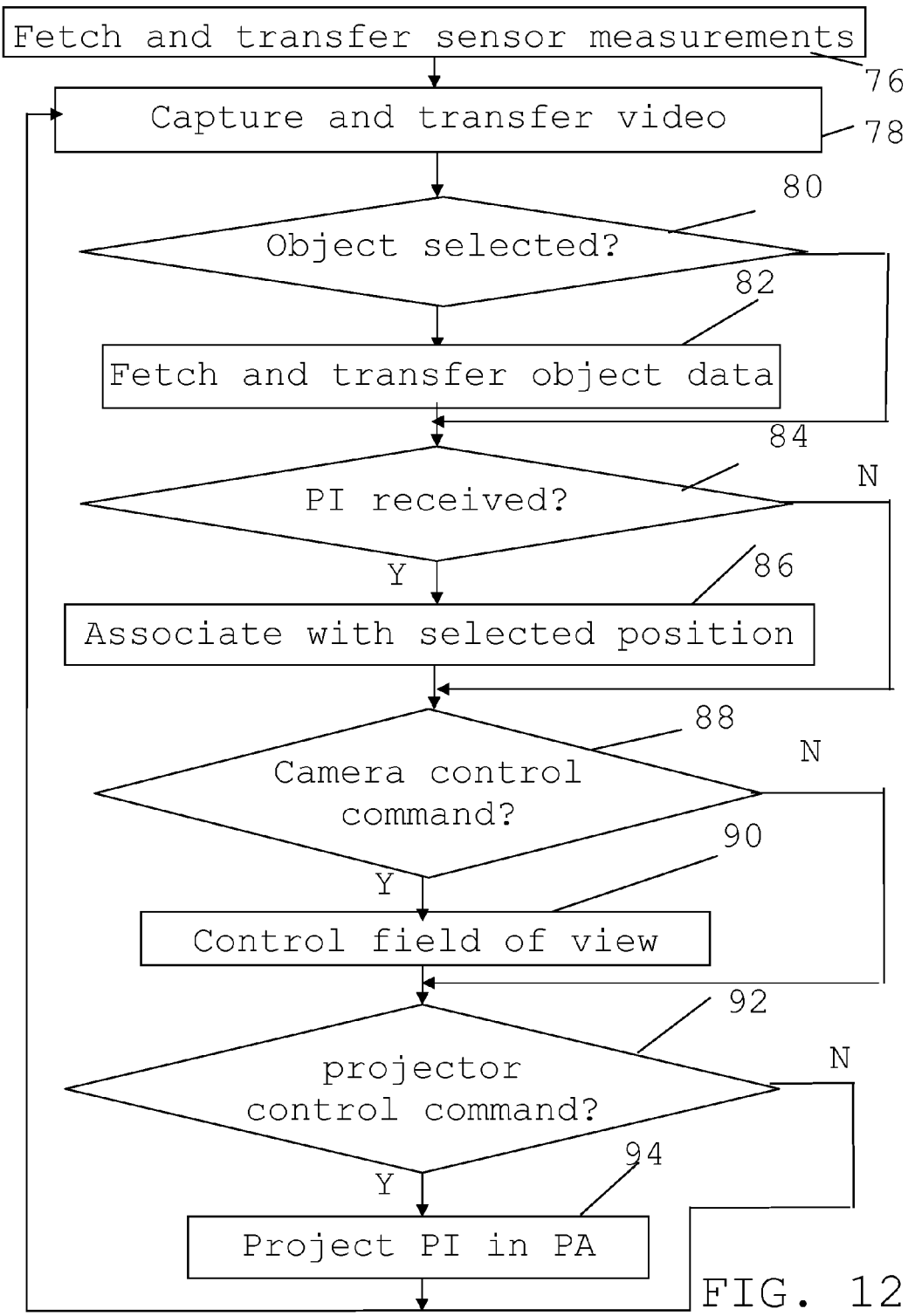

A second variation will now be described with reference being made to FIGS. 10, 11a, 11b and 12, where FIG. 10 schematically shows the location with the video communication device 32 providing a projecting area PA in which a presentation item PI is projected, FIGS. 11a and 11b schematically show the location with the video communication device 32 and presentation item PI when the projecting area PA is being moved, and FIG. 12 schematically shows a flow chart of a method of operating the video communication device 32 by the remote user 52.

When at the location the video communication device 32 is with advantage used for obtaining data from the location for provision to the remote user 32 and for receiving instructions from the remote user 52 to the local user at the location. This may be done via a two-way voice or video communication.

When a communication session is on-going the control unit 38 therefore fetches sensor measurements from sensors, such as the temperature sensor and the ambient light sensor and transfers these sensor measurements to the computer 51 of the remote user 52, step 76. The camera 34 also captures and transfers video VS to the remote user 52, step 78.

The remote user 52 may now want to obtain some more data about the process control objects that he sees in the video stream VS. He may for instance desire to obtain data of the temperature in a tank or the voltage of a transformer. In order to do this he may select an object in the video, or in the previously obtained model of the location. He may for instance detect an object identifier in the video and send the object identifier to the video communication device. He may also select an object in the model and the selection may be transferred to the control unit 38. The control unit 38 may then fetch data about the object from a database 20. It may for instance fetch a face plate with current data of the process control object.

The control unit 38 may therefore receive a process control object selection from the remote user 52, step 80, and based on this selection it fetches process control object data from the process control system such as from the database 20, and transfers the process control object data to the computer 51 of the remote user 52, step 82. A remote user 52 may thus select an object in the model of the location and when the object is selected he can obtain additional data such as faceplates with information of the operation.

After a process control object is selected or if no process control object is selected, the control unit 38 may receive a presentation item PI from the remote user. The remote user 52 may more particularly provide presentation items to be projected by the projector. The presentation item PI may be a digital presentation item and may be a digital still image such as an image of an arrow or a circle, a presentation such as a slide show or a string of text with an instruction. It may also be a drawing made by the remote user 52. The presentation item may thus be a remote user generated presentation item comprising instructions and visual indicators. The presentation item PI may therefore be an annotation image that is to be presented to the local user via the projector 48. If such a presentation item PI is received, step 84, it is also possible that a selection of position of the presentation item is received. The remote user may select a position for the presentation item PI in the 3D model 3DM of the location. This position selection may also be transferred to the control unit 38. The control unit 38 then associates the presentation item with the selected position, step 86. The position of the presentation item may be set using a solid angle and a radius related to the position of the video communication device and to a reference angle. A presentation item may thereby be assigned to a space in the three-dimensional model of the location. It is also possible to assign more than one presentation item in this way.

Thereafter the control unit 38 awaits possible camera control commands from the remote user 52. The camera control commands may comprise field of view control commands, such as zooming commands that change the size of the field of view but retains the same line of sight or orientation control commands that change the line of sight. Orientation control commands typically comprise panning commands. The remote user 52 may thus change the orientation of the camera 34 through rotating or tilting it. He may also zoom in and out. If commands are received, step 88, these commands are then used by the control unit 38. If the commands are field of view commands these are then used for controlling the field of view of the camera, step 90. Zooming commands are forwarded to the camera 34, which then zooms in or out depending on the type of control command. If tilting or rotation is required, the control unit 38 controls a corresponding motor to obtain the required movement.

Thereafter the control unit 38 may receive a projector control command from the remote user 52. The projector control command may comprise a command to project a presentation item PI. In some instances such a command may also be a command to project the presentation item at a specific desired position. If a projector control command is received, step 92, the projector 48 is controlled by the control unit 38 according to the command, which involves, if the control command is a command to project a presentation item PI, controlling the projector 48 to project the presentation item PI in the presentation area PA of the projector, step 94. If the command is to project at a specific position the projector is controlled to project the presentation item PI at this position. A command may also comprise a command to change the orientation of the presentation area. In this case the projector may be moved, using the same or another motor than the one used for the camera 34, and controlled to project the presentation item so that it appears at the desired position, step 94. The remote user may thus control the video communication device to project the presentation item at a selected space or position in the location. This may involve projecting the presentation item to a real world position corresponding to the associated position in the three-dimensional model. If a real world object at the location would be in front of the presentation item according to the presentation item position, then parts of the presentation item that would be blocked by the real world object are refrained from being presented.

If the projector is reoriented so that the presentation area PA is moved, the presentation item PI may be set to stay at the user selected position. As the presentation item is associated with the model, this also means that it is possible to retain the presentation item for later session at the location. Furthermore the projection of the presentation item is made independently of the presentation of the video. The control unit 38 may therefore control the projector 48 separately from or independently of the control of the camera 34. If for instance the camera 34 stream is zooming in on a detail so that the presentation item PI is outside of the field of view of the camera 34, then the presentation item PI will still be presented. The controlling of the presentation in the presentation area is thus performed independently of the controlling of the field of view of the camera. As is evident from the zooming example given above, this thus means that the position of presentation item in the presentation area PA of the projector 48 may be outside of the field of view of the camera. This also means that the presentation area PA may differ from the field of view of the camera 34. When the camera control are commands controlling the orientation of the camera and the projector control commands are commands controlling the orientation of the projector it can likewise be seen that the control of the orientation of the projector is performed independently of the control of the orientation of the camera, which thus means that the control of orientation of the camera does not influence the control of the orientation of the projector.

As can be seen in FIGS. 11a and 11b, the projecting area PA of the projector 48 may be movable. If there are several presentation items that may fit in the presentation area when located at a current position, these may be presented singly or simultaneously based on the commands of the remote user.

If for instance several presentation items are provided, where some are outside of the current location of the presentation area PA, the projector 48 may be reoriented so that one or more of these are projected. After assignment, the remote user may simply select a presentation item for being presented and the control unit 38 will control one or motors for reorienting the projector so that the presentation area covers the selected presentation item.

Thereafter the capturing of video, is continued, step 78 as well as waiting, step 80, 84, 88 and 92 for various commands from the remote user. This type of operation is continued as long as the session is on-going.

The remote user 52 may also send commands controlling the projector 48, the camera 34 as well as various sensors, such as the temperature sensor.

Through the video communication device 32 it is possible for the remote user to obtain knowledge of the operation of process control objects at the location as well as to obtain other information such as temperature at the location. In order to observe the location the remote user 52 may also rotate the camera and obtain visual data of the location. Through the voice connection the remote user may also communicate with a local user and receive audible comments on possible problems at the location.

The remote user may then determine appropriate actions, such as what process control objects and part of the these that are to be actuated and when. The remote user may for instance provide a number of presentation items, such as arrows and explaining text and assign these to different positions in the virtual model. The remote user may also provide a timing instruction, providing a sequence in which presentation items are to be presented. The commands and presentation items may then be sent to the video communication device 32, which presents them via the projector 48 in an order decided by the remote user 52. If the presentation items are provided in the presentation area at a current position, then these may be presented simultaneously. When a new presentation item needs to be presented that is outside the current field of view of the projector 48, i.e. outside the presentation area when in its current position, the projector 48 may be moved or reoriented so that the presentation area covers the position of the new presentation item. This movement of the projector 48 may be made independently of the camera 34. In this way it is possible for the remote user 52 to present information at one place, for instance instructions about actuating a certain process control object, while at the same time monitoring another object at another place not covered by the projector 48.

The second variation thus provides a way to allow a remote user to remotely guide personnel on site via a live video stream. The video communication device will also allow the local user and the remote user to communicate verbally. It will also allow the remote user to get an overview of the environment through the camera. The remote user can also scroll, pan and zoom the camera on site to get a superior overview of the situation from the remote location. As a 3D camera is used the remote user will be able to see a 3D model of the environment in case he needs additional space information about the location.

It is also possible for the remote user to add presentation items or information, such as annotations and drawings to the physical world by using the projector to project information onto the real world, i.e., the remote user can visually share information and annotations with the local user at the location.

All the sensors together with camera and sound recording equipment will enable a remote connected user to see, hear and feel the situation at the plant. The projector and sound generating equipment, may in turn be used to communicate information back from the remote user to the personnel on site. The projector is used to for the remote user to visually communicate information back to the plant personnel.

By allowing the remote user to take control of the video communication device, the remote user can browse the surroundings using the camera, by rotating, tilting and zooming. Once the remote user has information that he/she wants to share with the local users on site he can "draw" this information on to the presentation area using the projector. The remote user can use text, images, or simply draw objects on the remote screen. The drawings will then be projected on site using the projector. As the camera records a 3D model of the environment, the notes can also be left behind objects.

All visual information provided by the remote user may be augmented reality information, meaning that any annotations or drawings that the remote user adds are saved and connected with the point where they were added by using the constructed 3D model of the environment. This means that if the remote user rotates the camera after an annotation has been added the annotation will stay in the same spot.

As can be seen in FIG. 11 the remote user has added a presentation item PI. As the remote user rotates the video communication device 32, as can be seen in FIG. 11*b*, for instance in order to get a better overview of the presentation item PI is still projected correctly even through the position of the presentation area PA has been changed. It can thereby be seen that the real world position in which the presentation item is projected is retained even if the presentation area is moved.

Imagine the following scenario:
1. A Norwegian gas company unexpectedly experiences severe trouble at one of their offshore platforms. The problem is rare and technically complex, the operators on site need support from an expert in order to restore production.
2. Flying in an expert will take at least 48 hours as all experts are located far away.
3. The operator contacts a support company where an expert in this technical subject is available to instantly help the offshore platform with the problem.
4. Operators have discussions with the expert, the expert instructs the operators on site to bring the video communication device to a specific part of the process so that the remote expert can have a look at the problem.
5. The remote expert observes the situation using the camera, sound recording equipment and sensors.
6. Based on the information from the offshore platform the remote expert can now instruct the operators on site to perform certain operations to correct the problem.
7. The remote expert utilizes both voice and the possibility to visually share information with the users offshore. The possibility for the remote expert to use both voice and to visually share information is extremely effective as it is possible for the remote expert to instantly "point out" where operators on site should perform actions.

Through the second variation remote users are offered the possibility to instantly give support to any place in the world. No longer are they required to go to a site every time their assistance is needed, instead in many cases they can solve problems from their office. Remote users are offered a level of situational awareness that cannot be achieved with video streams alone by building a 3D model of the world.

Local users, such as maintenance-engineers are offered an unobtrusive and natural way of viewing augmented reality information which, in a lot of situations is superior to viewing AR information on a pair of head mounted glasses or via a hand held screen.

The remote user is able to add notes to the environment that are projected onto the actual surface of the equipment for the local maintenance engineer to view.

There is a possibility to add notes to a 3D model of the world and display those notes on spot by using projectors Notes added to the 3D model stick to their place even if the camera covers another position.

The annotations and notes added to the environment and/or the 3D model of the world may also be recorded and saved as part of the maintenance history for the industrial plant. They may also be later retrieved, if the video communication device is brought back to a known location.

It should also be realized that the two variations may be combined. The activities in the two variations may thus be carried out in the same communication session. In this case the knowledge that the remote user gets of the location in the first variation may be used to control the video communication device and especially in the use of presentation items.

The video communication device was above described as being provided with a projector and including a tripod. It should be realized that the video communication device may be a handheld device such as a camcorder, laptop computer or a mobile phone, like a smartphone.

Figure 13:
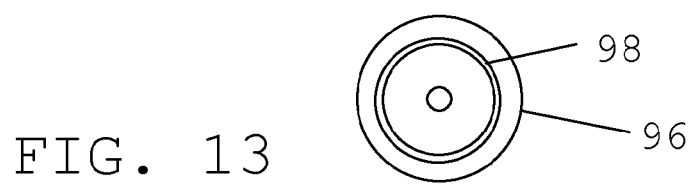

The control unit may, as was mentioned above, be provided in the form of a processor together with memory including computer program code for performing its functions. This computer program code may also be provided on one or more data carriers which perform the functionality of the control unit when the program code thereon is being loaded into the memory and run by the processor. One such data carrier 96 with computer program code 98, in the form of a CD ROM disc, is schematically shown in FIG. 13.

The invention can be varied in many more ways than the ones already mentioned. It should therefore be realized that the present invention is only to be limited by the following claims.

The invention claimed is:

1. A method of transmitting video to a remote user from an industrial site where a process control system is operated, the method being performed by a video communication device being placed at a location of the industrial site and performed in relation to a communication session carried out between the video communication device and a device of the remote user, the method comprising:
   obtaining a three-dimensional model of the location and the various objects at the location;
   obtaining the position of the video communication device at the location;
   capturing video images of the location using a camera of the video communication device;
   determining a current orientation of the camera;
   adding a representation of the video communication device to the three-dimensional model of the location so that the video communication device is shown in the model; and
   transferring, in the communication session from the video communication device to the device of the remote user, the three-dimensional model and the orientation of the camera and the position of the video communication device together with a video stream comprising the captured video images.

2. The method according to claim 1, further comprising investigating if there is a pre-existing three-dimensional model of the location, fetching and using the pre-existing model if there is one and otherwise creating the three-dimensional model based on scanning the location.

3. The method according to claim 1, wherein the orientation of the camera is provided as a solid angle related to the position of the video communication device and a reference angle.

4. The method according to claim 2, if there is a pre-existing three-dimensional model, further comprising obtaining previous positions of the video communication device, possibly together with previous orientations of the camera and video recordings made at these previous positions.

5. The method according to claim 1, wherein the orientation of the camera is provided as a part of the three-dimensional model that is continuously transferred to the device of the remote user.

6. The method according to claim 1, wherein the orientation of the camera is transferred as updates of the three-dimensional model during the transfer of video images from the video communication device to the device of the remote user.

7. A video communication device for transmitting video to a remote user from an industrial site where a process control system is operated, the video communication device being placed at a location of the industrial site and comprising:
   a communication interface for providing a communication session between the video communication device and a device of the remote user;
   a camera capturing images; and
   a control unit configured to:
      obtain a three-dimensional model of the location and the various objects at the location;
      obtain the position of the video communication device at the location;
      control the camera to capture video images of the location;
      determine a current orientation of the camera;
      add a representation of the video communication device to the three-dimensional model of the location so that the video communication device is shown in the model; and
      transfer, in the communication session from the video communication device to the device of the remote user, the three-dimensional model and the orientation of the camera and the position of the video communication device together with a video stream from the camera comprising the captured video images.

8. The video communication device according to claim 7, the control unit being further configured to investigate if there is a pre-existing three-dimensional model of the location, fetch and use the pre-existing model if there is one and otherwise create the three-dimensional model based on scanning the location using the camera.

9. The video communication device according to claim 7, wherein the orientation of the camera is provided as a solid angle related to the position of the video communication device and a reference angle.

10. The video communication device according to claim 8, wherein if there is a pre-existing three-dimensional model, the control unit is further configured to obtain previous positions of the video communication device, possibly together with previous orientations of the camera and video recordings made at these previous positions.

11. The video communication device according to claim 7, wherein the orientation of the camera is provided as a part of the three-dimensional model that is continuously transferred to the device of the remote user.

12. The video communication device according to claim 7, wherein the orientation of the camera is transferred as updates of the three-dimensional model during the transfer of video images from the video communication device to the device of the remote user.

13. A computer program product for transmitting video to a remote user from an industrial site where a process control system is operated, said computer program product being provided on a non-transitory data carrier comprising computer program code configured to cause a video communication device comprising a camera to, when said computer program code is loaded into the video communication device and the video communication device is placed at a location of the industrial site and there is a communication session between the video communication device and a device of the remote user,
- obtain a three-dimensional model of the location and the various objects at the location;
- obtain the position of the video communication device at the location;
- capture video images of the location using the camera;
- determine a current orientation of the camera;
- add a representation of the video communication device to the three-dimensional model of the location so that the video communication device is shown in the model; and
- transfer, in the communication session from the video communication device to the device of the remote user, the three-dimensional model and the orientation of the camera and the position of the video communication device together with a video stream comprising the captured video images.

14. The method according to claim 2, wherein the orientation of the camera is provided as a solid angle related to the position of the video communication device and a reference angle.

15. The method according to claim 2, wherein the orientation of the camera is provided as a part of the three-dimensional model that is continuously transferred to the device of the remote user.

16. The method according to claim 3, wherein the orientation of the camera is provided as a part of the three-dimensional model that is continuously transferred to the device of the remote user.

17. The method according to claim 4 wherein the orientation of the camera is provided as a part of the three-dimensional model that is continuously transferred to the device of the remote user.

18. The method according to claim 2, wherein the orientation of the camera is transferred as updates of the three-dimensional model during the transfer of video images from the video communication device to the device of the remote user.

19. The method according to claim 3, wherein the orientation of the camera is transferred as updates of the three-dimensional model during the transfer of video images from the video communication device to the device of the remote user.

20. The method according to claim 4, wherein the orientation of the camera is transferred as updates of the three-dimensional model during the transfer of video images from the video communication device to the device of the remote user.

* * * * *